United States Patent [19]

Karlsen et al.

[11] Patent Number: 5,711,776
[45] Date of Patent: Jan. 27, 1998

[54] AIR ESCAPING MEANS

[75] Inventors: Morten Karlsen, Øvre Årdal; Robert Sandvik, Årdalstangen, both of Norway

[73] Assignee: Norsk Hydro a.s., Oslo, Norway

[21] Appl. No.: 656,832

[22] Filed: Jun. 3, 1996

[30] Foreign Application Priority Data

Jun. 2, 1995 [NO] Norway .................................. 952218

[51] Int. Cl.⁶ .................................................. B01D 45/08
[52] U.S. Cl. ........................... 55/325; 55/332; 55/463; 55/465
[58] Field of Search .......................... 55/325, 463, 465, 55/304, 527, 336, 322, 332, 331, DIG. 14; 95/31–35, 267–272

[56] References Cited

U.S. PATENT DOCUMENTS

| | | | |
|---|---|---|---|
| 3,530,649 | 9/1970 | Porsch et al. | 55/465 X |
| 3,685,257 | 8/1972 | Burke | 55/304 X |
| 3,957,471 | 5/1976 | Tamachi et al. | 55/396 |
| 5,061,304 | 10/1991 | Gorzegno et al. | 55/325 X |

FOREIGN PATENT DOCUMENTS

| | | |
|---|---|---|
| 0 424 079 | 4/1991 | European Pat. Off. . |
| 24 03 689 | 8/1975 | Germany . |
| 601031 | 4/1978 | U.S.S.R. ...... 55/325 |

Primary Examiner—Richard L. Chiesa
Attorney, Agent, or Firm—Wenderoth, Lind & Ponack

[57] ABSTRACT

A de-aeration device for the separation of solid particles from a gas includes a container with an inlet for the supply of the gas contaminated with particles and an outlet for the purified gas. The cross-section of the container is dimensioned in such a way that the gas velocity does not exceed the carrying velocity of the particles. The gas flow is deflected at the inlet so that it flows mainly sideways in relation to the direction of through-flow of the container. The outlet of the container is provided with a filter cloth.

11 Claims, 1 Drawing Sheet

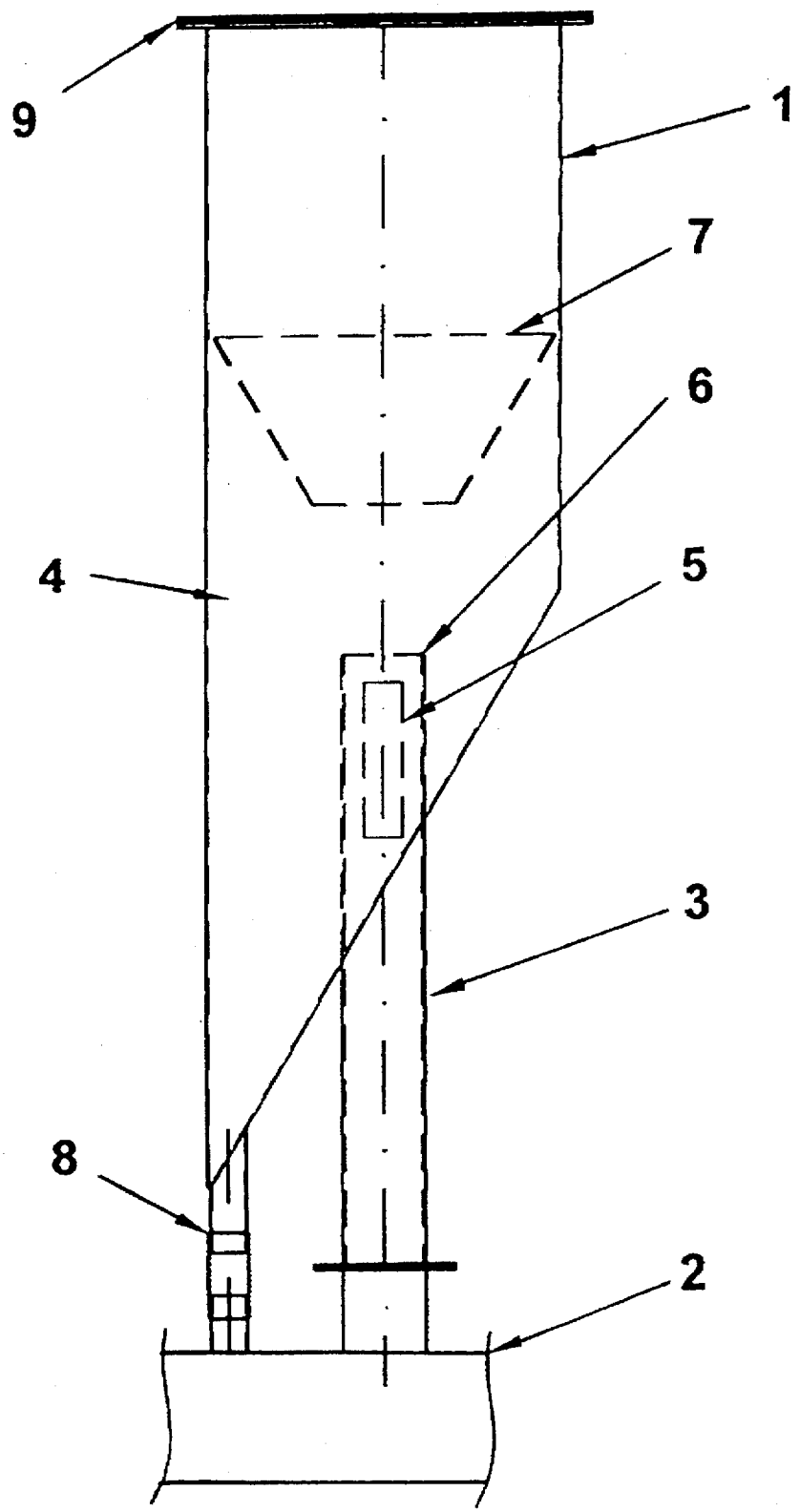

AIR ESCAPING MEANS

BACKGROUND OF THE INVENTION

The present invention relates to a de-aeration device for the separation of solid particles from air or another gas.

Previous devices are known for the separation of solid particles from a gas, which devices are based on the creation of a centrifugal effect by means of an eddy current so that the particles in the gas are hurled outwards against a wall or similar in a chamber and then fall downwardly therefrom.

The gas velocity employed for these known solutions, which are shown, for example, in EP-A1-0424079, must be relatively high for the centrifugal principle in question to work. Furthermore, a majority of the smaller particle fractions with a size of 1–20 μm will have too low a weight to be separated. The types of separator in question are, therefore, not very effective with gases which contain small particles and which flow at low velocities.

When conveying powdered material in fluidization channels, small quantities of air are used to fluidize the material. This air carries with it small particles which will contaminate the surroundings when discharged into the open air.

SUMMARY OF THE INVENTION

With the present invention it is possible to manufacture a de-aeration device for the separation of solid particles from a gas which is very simple and cheap to produce and which is specially designed to separate small particles from a gas which is flowing at low velocity, for example air from fluidization channels as stated above.

The invention provides that the cross-section of the container is dimensioned in such a way that the velocity of the gas does not exceed the carrying velocity for the particles, that the gas flow is deflected at the inlet so that it flows mainly sideways in relation to the container direction of through-flow and that the outlet of the container is provided with a filter cloth.

BRIEF DESCRIPTION OF THE DRAWINGS

The invention will be described in further detail in the following using examples and with reference to the enclosed drawing which shows a schematic diagram of a de-aeration device connected to a fluidization channel via a connection pipe.

DETAILED DESCRIPTION OF THE INVENTION

A de-aeration device 1 comprises a drum or container 4 which can preferably have a circular or basically circular cross-section. The diameter (the cross-sectional area) of the container must, in principle, be sufficiently large such that the flow of air or gas does not carry particles with it. For dust from aluminum oxide it has been calculated that the air velocity in a connection pipe 3 from a fluidization channel 2 must be less than 2 m/s and the air velocity in the container 4 must be less than 0.3 m/s.

An important point in this connection is that the supply pipe 3 must not have an opening which is directed longitudinally along the container 4 because this will produce a flow of air from the opening of the pipe 3 which will be longitudinal along the container and which may be greater than the velocity of the upper "carrying air flow". In the example shown in the drawing, therefore, the connection pipe 3 extends into the container 4 and the air flows sideways out through hole 5 in the side of the pipe while the end of the pipe is provided with a sealing plate 6.

Thus it is important that the flow of air is deflected at the inlet of the container 4. Another arrangement in this connection would be to install another deflection device as shown in the drawing, where a conical plate 7 or similar device is shown. This will contribute to directing parts of the flow of air downwards. The plate 7 can preferably be perforated so that parts of the air pass through the perforations in the plate at reduced velocity.

The container is also provided with a diagonal (funnel-shaped) lower part which is designed to pass the separated, solid particles to a separate return pipe 8.

In order to separate the very smallest particle fractions and any larger particle fractions which have not been separated in the lower part of the container, a flexible filter cloth 9 is arranged on the top of the container. Such filter cloth is preferably of glass fiber material.

The flexibility of the cloth has proved to have the result that the cloth is self-cleaning. The reason is that the cloth will bulge out or in on account of changes in pressure in the container 4 and thus cause any adhered particles to "peel off".

It should be noted that the invention is not restricted to the solution which is shown in the drawing and described above. Thus, instead of two pipes, one connection pipe 3 for the supply of the gas contaminated with particles and one return pipe 8 for separated particles, just one pipe can be used, but with two separate channels for the two purposes. Thus the pipe 3 with the greater diameter can be arranged where the pipe 8 is shown in the drawing so that one channel in pipe 3 can be used for the supply of the gas contaminated with particles and the other channel can be used to return the separated particles. It is, however, important that the other channel for the return of the particles or pipe 8 has a much smaller diameter than the pipe 3 for supplying the gas contaminated with particles.

We claim:

1. A de-aeration device for separating solid particles from a gas, said device comprising:
    a container having an inlet for the supply of gas contaminated with solid particles to be removed and a gas outlet for discharging purified gas;
    said container having a flow-through direction extending from said inlet to said gas outlet;
    said container having a cross section dimensioned in a manner such that gas flows through said container at a velocity that is less than a velocity necessary for the gas to carry the solid particles;
    means at said inlet to deflect the incoming gas to be caused to flow substantially laterally of said flow-through direction and
    a filter cloth provided across said gas outlet.

2. A device as claimed in claim 1, wherein said gas outlet is located above said inlet, and said inlet is positioned at a lower part of said container.

3. A device as claimed in claim 2, further comprising a separated particle outlet provided in said lower part of said container.

4. A device as claimed in claim 3, wherein said lower part of said container inclined downwardly from said inlet to said separated particle outlet.

5. A device as claimed in claim 1, wherein said container further includes a separated particle outlet at a position below said gas outlet.

6. A device as claimed in claim 1, wherein said filter cloth is flexible.

7. A device as claimed in claim 6, wherein said filter cloth is formed of glass fiber material.

8. A device as claimed in claim 1, wherein said filter cloth is formed of glass fiber material.

9. A device as claimed in claim 1, wherein said inlet comprises a connection pipe extending into said container in a direction parallel to said flow-through direction, and said means comprises a lateral opening from said pipe.

10. A device as claimed in claim 9, further comprising a plate closing an inner end of said connection pipe.

11. A device as claimed in claim 9, wherein said means further comprises a conical plate positioned in said container at a position confronting an inner end of said connection pipe.

* * * * *